July 4, 1950
S. D. KAGANOFF
HALOGENATED POLYMERS AND METHODS
OF PREPARING THE SAME
Filed March 29, 1945
2,513,330
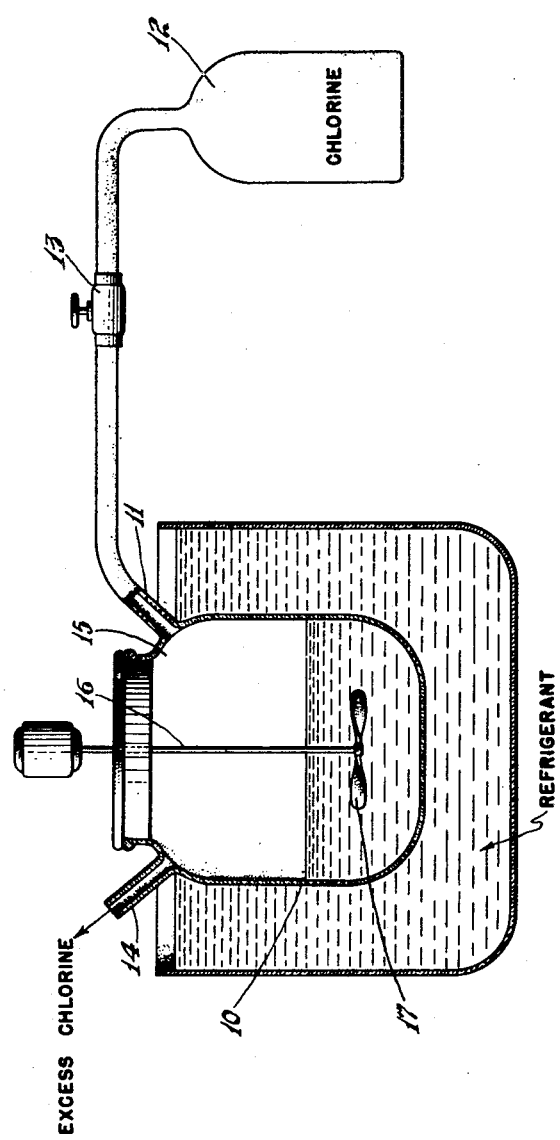
INVENTOR.
SOLOMON D. KAGANOFF
BY
ATTORNEY Patented July 4, 1950

2,513,330

UNITED STATES PATENT OFFICE 2,513,330

HALOGENATED POLYMERS AND METHODS OF PREPARING THE SAME

Solomon D. Kaganoff, New York, N. Y., assignor to Federal Telephone and Radio Corporation, New York, N. Y., a corporation of Delaware Application March 29, 1945, Serial No. 585,492

1 Claim. (Cl. 260—93.5)

This invention relates to novel compositions of matter and to methods and steps in the methods for preparing the same. More particularly this invention is directed to halogenating, and especially to novel methods for halogenating normally solid polymers and copolymers of normally liquid or gaseous monomers. In its more specific aspects the invention is directed to novel methods for halogenating and more especially chlorinating or brominating normally solid polymers and copolymers of normally fluid (liquid or gaseous) unsaturated hydrocarbon monomers having more than two carbon atoms.

Prior to this invention normally solid polymers or copolymers of normally fluid unsaturated hydrocarbon monomers have been halogenated, for example chlorinated, by first dissolving said solid in a solvent therefor and thereafter bubbling chlorine gas therethrough until the desired amount of chlorine was absorbed thereby. Thereafter this solution containing the chlorinated polymer or copolymer was heated or in some other manner treated in order to drive off or remove the solvent therefrom. While this method of chlorinating was satisfactory for some purposes, in some cases it was found to be unsatisfactory because the solvent many times was not completely and entirely removed therefrom and it is believed that a small part of the same, either became physically entrapped in the chlorinated polymer or copolymer or in small amounts chemically reacted therewith.

According to a preferred form of this invention, normally solid polymers and copolymers of normally fluid (liquid or gaseous) unsaturated hydrocarbon monomers may be chlorinated by treating the same with chlorine and without the use of a separate solvent for said polymer or copolymer. In the course of experimentation with said normally solid polymers and copolymers, I have discovered that they may be chlorinated by treating them with liquid chlorine. In this instance, the liquid chlorine serves both as the solvent for the polymer and also as the chlorinating agent. In the practice of this invention, one of said normally solid polymers or copolymers is dissolved in liquid chlorine until a fairly substantially clear solution is obtained; thereafter the temperature of said solution is raised whereupon the excess chlorine is removed therefrom, leaving a residue which is the chlorinated polymer or copolymer.

In accordance with this invention, I may start with a normally solid polymer or copolymer of normally fluid unsaturated hydrocarbon monomers having more than two carbon atoms, and being of either or both of the aromatic or aliphatic series.

Examples of some of said normally solid polymers and copolymers are polystyrene, polyvinylnaphthalene, polybutadiene, polybutene, polypropylene, polyindene, polycyclopentadiene, cyclized polyisoprene and copolymers of butadiene and styrene.

The molecular weight of the solid polymer or copolymer employed is preferably at least 40 and more preferably between 60 and 120 times the molecular weight of the monomer. Ordinarily, the solid polymer or copolymer is first comminuted and then placed in a glass reaction vessel. The reaction vessel, together with the contents therein are cooled to below −33.6° C. by surrounding the reaction vessel with a suitable refrigerant such as the well-known acetone-carbon dioxide refrigerant or the like. When the normally solid polymer or copolymer in said vessel has attained a temperature below −33.6° C. and preferably between about −40° C. and −100° C., chlorine in either the gaseous or liquid state is admitted into said vessel. When the chlorine admitted is in the gaseous state, it becomes liquified due to the temperature within the reaction vessel and this liquid chlorine mixes with said polymer or copolymer. The mixture is agitated in the course of the addition of said liquid chlorine thereto. The agitation and the addition of said liquid chlorine is continued until the polymer or copolymer has substantially completely dissolved in said liquid chlorine. After a substantially clear solution of the polymer or copolymer in said liquid chlorine is obtained, at said temperature between −40° C. and −100° C., the refrigerant is removed from around the reaction vessel and the mass therewithin is allowed to come to room temperature. As the temperature of the solution rises up to and beyond −33.6° C., in the course of attaining room temperature the excess chlorine evaporates therefrom leaving behind a solid residue which is the chlorinated polymer or copolymer. If desired, this chlorinated polymer or copolymer may be heated to about 60° C. in order to assure removal of substantially all of the unreacted chlorine and the chlorinated polymer or copolymer is ready for use.

The invention accordingly comprises the several steps and the relation of one or more of such steps with respect to each of the others thereof, which will be exemplified in the process hereinafter disclosed, and the scope of the invention will be indicated in the claims.

For a fuller understanding of the nature and objects of the invention, reference should be had to the following detailed description taken in connection with the accompanying drawings, in which:

The figure is a schematic representation of the general apparatus which may be employed in carrying out this invention.

As shown in the drawing, there may be provided a 3-necked flask 10 composed of glass. The flask 10 has an inlet neck 11 connected through a regulating valve 13 to a chlorine containing tank 12. The flask 10 has a neck 14 which serves an outlet and an intermediate enlarged neck 15 supporting a rotatable stirring rod 16 carrying a mixing blade 17 at the lower end thereof. In the practice of this invention, a quantity of one of said polymers or copolymers in comminuted form is placed in the bottom of flask 10 and until it occupies a space which is no greater than about 20% of the capacity of said flask. Then the stirring rod is mounted in said flask as shown with the stirrer 17 being located in the mass of said comminuted particles. The neck 11 is connected through valve 13 to the tank containing chlorine. At this stage, the valve 13 is closed and the flask is immersed in a refrigerant such as acetone-carbon dioxide, or other suitable refrigerant capable of lowering the temperature within the flask between about $-40°$ C. and $-100°$ C. When the temperature of the mass of said polymer or copolymer in said flask has attained this reduced temperature and for example, about $-75°$ C., the valve 13 is opened so that gaseous chlorine passes slowly through the neck 11 and is admitted into the reaction vessel 10. As the chlorine enters said vessel, some of it liquifies and drops downwardly onto the comminuted polymer or copolymer, which is being agitated by the propeller or mixing blade 17 and any unliquified chlorine passes out of the neck 14 and may be recovered in any desired manner. This action is continued until sufficient liquid chlorine has been added to said polymer or copolymer to substantially completely dissolve the same. Solution is evidenced by there being produced a fairly clear, liquid substantially free of particles of such size as to be visible to the naked eye. After said solution of said polymer or copolymer in said liquid chlorine is obtained at said temperature below $-33.6°$ C. and between about $-40°$ C. and $-100°$ C., the valve 13 is closed and the reaction flask, together with its contents is removed from the refrigerant and allowed to stand in an atmosphere at room temperature whereupon the excess chlorine evaporates and passes out of neck 14 and is collected in a suitable chlorine absorbing medium. After most of the free chlorine has evaporated, there is left behind in said flask the polymer or copolymer now in the chlorinated state. Then the flask, together with the chlorinated normally solid polymer or copolymer therein is heated to about 60° C. in order to assure the removal of all excess chlorine. The resultant mass, which is a solid chlorinated product of one of said normally solid polymers or copolymers may be removed from said flask and may be compounded in any desired manner. By practicing the method as above set forth, I have found that substantial amounts of chlorine are combined with said polymers and copolymers and that this chlorine is tightly held thereby. When solid polystyrene (molecular weight of at least 40,000 or preferably approximately 60,000 to 120,000 by Staudinger method) is chlorinated by the above method, the per cent of firmly held chlorine in the final chlorinated polystyrene product is approximately 40% by weight. When polystyrene whose molecular weight was 80,000 (Staudinger) was subjected to the above method of chlorination, the final chlorinated product contained 40% ± 2% chlorine by weight.

As mentioned earlier, the invention is equally applicable to the bromination of normally solid polymers or copolymers of normally fluid unsaturated hydrocarbon monomers having more than two carbon atoms and being either or both of the aromatic or aliphatic series. As a specific example of the bromination process, the method described above for the chlorination of solid polystyrene may be followed, except that the temperatures used are below 10° C. The resulting product was a heavy viscous mass which hardened on standing. The hardened material was crushed and pulverized, dissolved in chloroform and precipitated with methanol. A fine white powder was obtained which upon analysis by the Parr bomb method indicated approximately 57% bromine.

Since certain changes in carrying out the above process and certain modifications in the compositions which embody the invention may be made without departing from its scope, it is intended that all matter contained in the description shall be interpreted as illustrative and not in a limiting sense.

It is also to be understood that the following claims are intended to cover all the generic and specific features of the invention herein described, and all statements of the scope of the invention, which as a matter of language might be said to fall therebetween.

I claim:

A method of chlorinating a solid polymer of styrene which comprises dissolving said polymer in liquid chlorine and reacting said polymer with a portion of the liquid chlorine in which it is dissolved in the absence of a solvent other than the liquid chlorine itself and thereafter removing unreacted liquid chlorine.

SOLOMON D. KAGANOFF.

REFERENCES CITED

The following references are of record in the file of this patent:

UNITED STATES PATENTS

| Number | Name | Date |
|---|---|---|
| 1,890,772 | Dykstra | Dec. 13, 1932 |
| 2,072,255 | Fuelnegg | Mar. 2, 1937 |
| 2,183,556 | Fawcett | Dec. 19, 1939 |
| 2,291,574 | Gleason | July 28, 1942 |
| 2,406,319 | Brooks | Aug. 27, 1946 |

FOREIGN PATENTS

| Number | Country | Date |
|---|---|---|
| 573,065 | Germany | Mar. 27, 1933 |

OTHER REFERENCES

Michalek Chemical and Engineering News, Sept. 25, 1944, pages 1559-1563.